(12) United States Patent
Impola et al.

(10) Patent No.: US 12,066,538 B2
(45) Date of Patent: Aug. 20, 2024

(54) PERIPHERAL PERCEPTION SYSTEM FOR A MACHINE

(71) Applicant: Caterpillar Paving Products Inc., Brooklyn Park, MN (US)

(72) Inventors: Todd Alex Impola, Minnetonka, MN (US); Timothy M. O'Donnell, Long Lake, MN (US); Jacob J. McAlpine, Otsego, MN (US); Christopher Andrew Wahlmark, Washington, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 980 days.

(21) Appl. No.: 17/071,037

(22) Filed: Oct. 15, 2020

(65) Prior Publication Data

US 2022/0120907 A1 Apr. 21, 2022

(51) Int. Cl.
| | |
|---|---|
| *G01S 17/89* | (2020.01) |
| *B60R 11/04* | (2006.01) |
| *E01C 21/00* | (2006.01) |
| *G01S 17/931* | (2020.01) |
| *E01C 19/26* | (2006.01) |
| *E01C 19/28* | (2006.01) |

(52) U.S. Cl.
CPC .............. *G01S 17/89* (2013.01); *B60R 11/04* (2013.01); *G01S 17/931* (2020.01); *B60R 2300/105* (2013.01); *B60R 2300/802* (2013.01); *E01C 19/26* (2013.01); *E01C 19/282* (2013.01); *E01C 21/00* (2013.01)

(58) Field of Classification Search
CPC ........ G01S 17/89; G01S 17/931; E01C 19/26; E01C 19/282; E01C 21/00
See application file for complete search history.

(56) References Cited

U.S. PATENT DOCUMENTS

| | | | |
|---|---|---|---|
| 10,203,412 B2 | 2/2019 | Smith et al. | |
| 2014/0146167 A1* | 5/2014 | Friend ................. | G05D 1/0225 348/118 |
| 2015/0361642 A1* | 12/2015 | Stratton ................. | G06F 16/29 701/461 |

(Continued)

FOREIGN PATENT DOCUMENTS

| | | |
|---|---|---|
| GB | 2332415 B | 11/2001 |
| WO | 2017063018 A1 | 4/2017 |

*Primary Examiner* — Isam A Alsomiri
*Assistant Examiner* — Joseph C Fritchman

(57) ABSTRACT

A peripheral perception system for providing a 360-coverage of a peripheral region around a machine is disclosed. The peripheral perception system includes a first perception device mounted to a first surface of the machine, defining a first elevation and a first angle with respect to a vertical axis of the machine; and a second perception device mounted to a second surface of the machine, defining a second elevation and a second angle with respect to the vertical axis. The first perception device scans a first field of view covering a first peripheral region of the machine and the second perception device scans a second field of view covering a second peripheral region of the machine, such that the first field of view and the second field of view combinedly provide 360-degree coverage of the peripheral region around the machine.

20 Claims, 5 Drawing Sheets

(56) References Cited

U.S. PATENT DOCUMENTS

2016/0104379 A1\* 4/2016 Reinards ................ G08G 1/165
                                                             340/435
2016/0223673 A1\* 8/2016 Smith ..................... G01S 17/89
2019/0050959 A1\* 2/2019 Husted .................. G06T 3/0081
2019/0129429 A1 5/2019 Juelsgaard et al.
2020/0376689 A1\* 12/2020 Rembisz ................ B25J 9/1697
2021/0100156 A1\* 4/2021 Iwase ...................... G01S 7/497
2021/0312203 A1\* 10/2021 Patzwaldt .............. G06V 20/56

\* cited by examiner

PERIPHERAL PERCEPTION SYSTEM FOR A MACHINE

TECHNICAL FIELD

The present disclosure relates generally to systems for monitoring exterior surroundings of a machine. More particularly, the present disclosure relates to a system for providing a 360-degree peripheral perception of the surroundings of the machine.

BACKGROUND

Many machines, such as compactors, pavers, haul trucks, dozers, motor graders, excavators, wheel loaders, and other types of equipment are known for performing a variety of construction or earth moving tasks. Such machines may be equipped with a perception system having a variety of sensing units such as cameras, lidar sensors, and/or radar sensors, mounted on the machine to facilitate monitoring of the surroundings of the machine during operations. These sensing units scan and collect data associated with the working environment around the machine, which is further processed to map, detect, and/or identify the working environment and/or obstacles around the machine.

During operation at a worksite, it is desirable to obtain a 360-degree coverage of the working environment around the machine. Typically, to obtain such a 360-degree coverage, at least four sensing units are required to be mounted on the machine, preferably, at the front, rear, and at the two sides of the machine. However, processing the data collected using at least four sensing units can be complex and typically requires high end processing systems with high computational powers. Furthermore, installation of several such sensing units on the machine require multiple installation hardware, which may significantly contribute to the overall costing and footprint of the machine.

U.S. Pat. No. 10,203,412 discloses a system for determining a position of a machine in a worksite. The system includes multiple lidar units disposed on the machine, specifically, at front and the respective sides, to scan objects surrounding the machine. Each lidar unit is comprised of multiple lidar devices, each having 180-degree field of view. Such lidar devices are integrated back-to-back, to form one lidar unit with 360-degree field of view.

SUMMARY OF THE INVENTION

In an aspect of the present disclosure, a peripheral perception system for providing a 360-coverage of a peripheral region around a machine is disclosed. The peripheral perception system includes a first perception device configured to be mounted to a first surface of the machine. The first perception device defines a first elevation with respect to an operational surface underlying the machine and a first angle with respect to a vertical axis defined along a height of the machine. The first perception device is configured to scan a first field of view covering a first peripheral region of the machine including a first lateral side of the machine, a first part of a forward end of the machine, and a first part of a rearward end of the machine. Also, the peripheral perception system includes a second perception device configured to be mounted to a second surface of the machine. The second peripheral device defines a second elevation with respect to the operational surface and a second angle with respect to the vertical axis. The second perception device is configured to scan a second field of view covering a second peripheral region of the machine including a second lateral side of the machine disposed opposite to the first lateral side of the machine, a second part of the forward end of the machine, and a second part of the rearward end of the machine. The first field of view and the second field of view combinedly provide a 360-degree coverage of the peripheral region around the machine.

In another aspect, the present disclosure is directed to a machine defining a forward end, a rearward end, a first lateral side and a second lateral side opposite to the first lateral side. The machine includes an operator cabin having a first surface and a second surface. Also, the machine includes a first perception device mounted to the first surface of the operator cabin. The first perception device defines a first elevation with respect to an operational surface underlying the machine and a first angle with respect to a vertical axis defined along a height of the machine. The first perception device is configured to scan a first field of view covering a first peripheral region of the machine including the first lateral side of the machine, a first part of the forward end, and a first part of the rearward end of the machine. Also, the machine includes a second perception device mounted to the second surface of the operator cabin. The second perception device defines a second elevation with respect to the operational surface underlying the machine and a second angle with respect to the vertical axis. The second perception device is configured to scan a second field of view covering a second peripheral region of the machine including the second lateral side of the machine, a second part of the forward end, and a second part of the rearward end of the machine. The first field of view and the second field of view overlap towards and beyond the forward end and the rearward end of the machine. Moreover, the first field of view and the second field of view combinedly provide a 360-degree coverage of a peripheral region around the machine.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
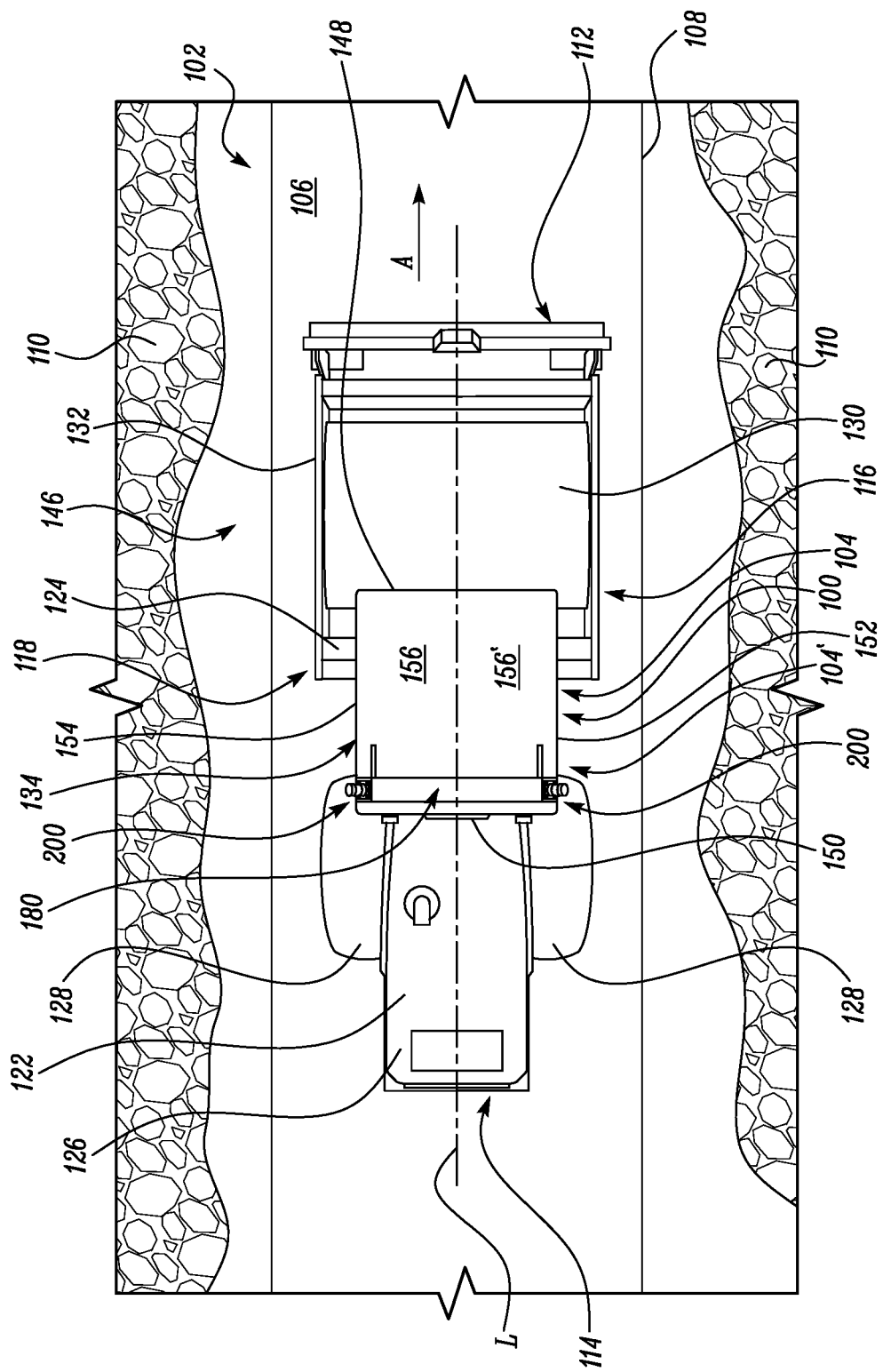
FIG. 1 is a top view of an exemplary machine operating at a worksite, in accordance with an embodiment of the present disclosure.
Figure 2:
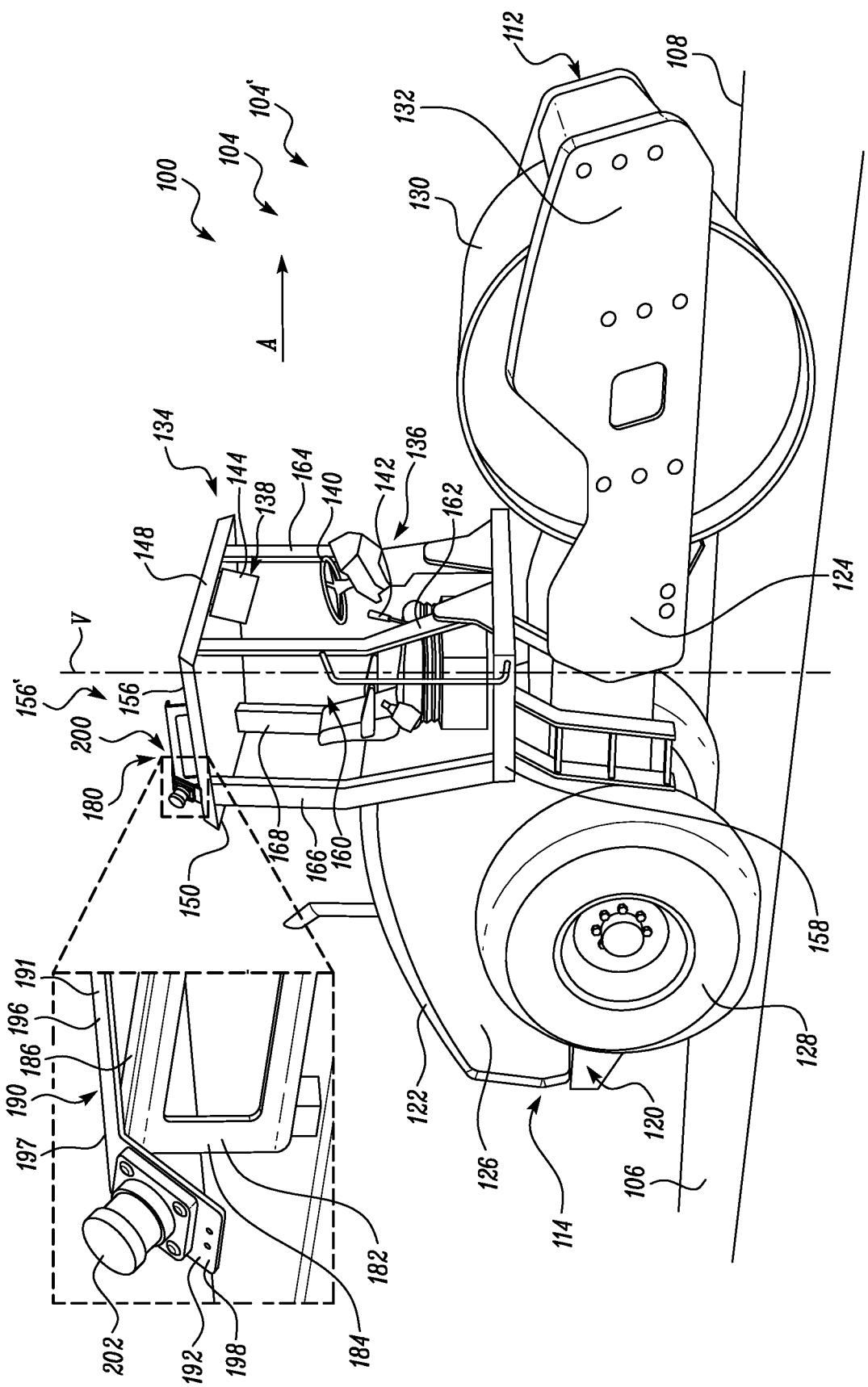
FIG. 2 is a perspective view of the machine of FIG. 1 having a peripheral perception system mounted thereon, in accordance with an embodiment of the present disclosure.
Figure 3:
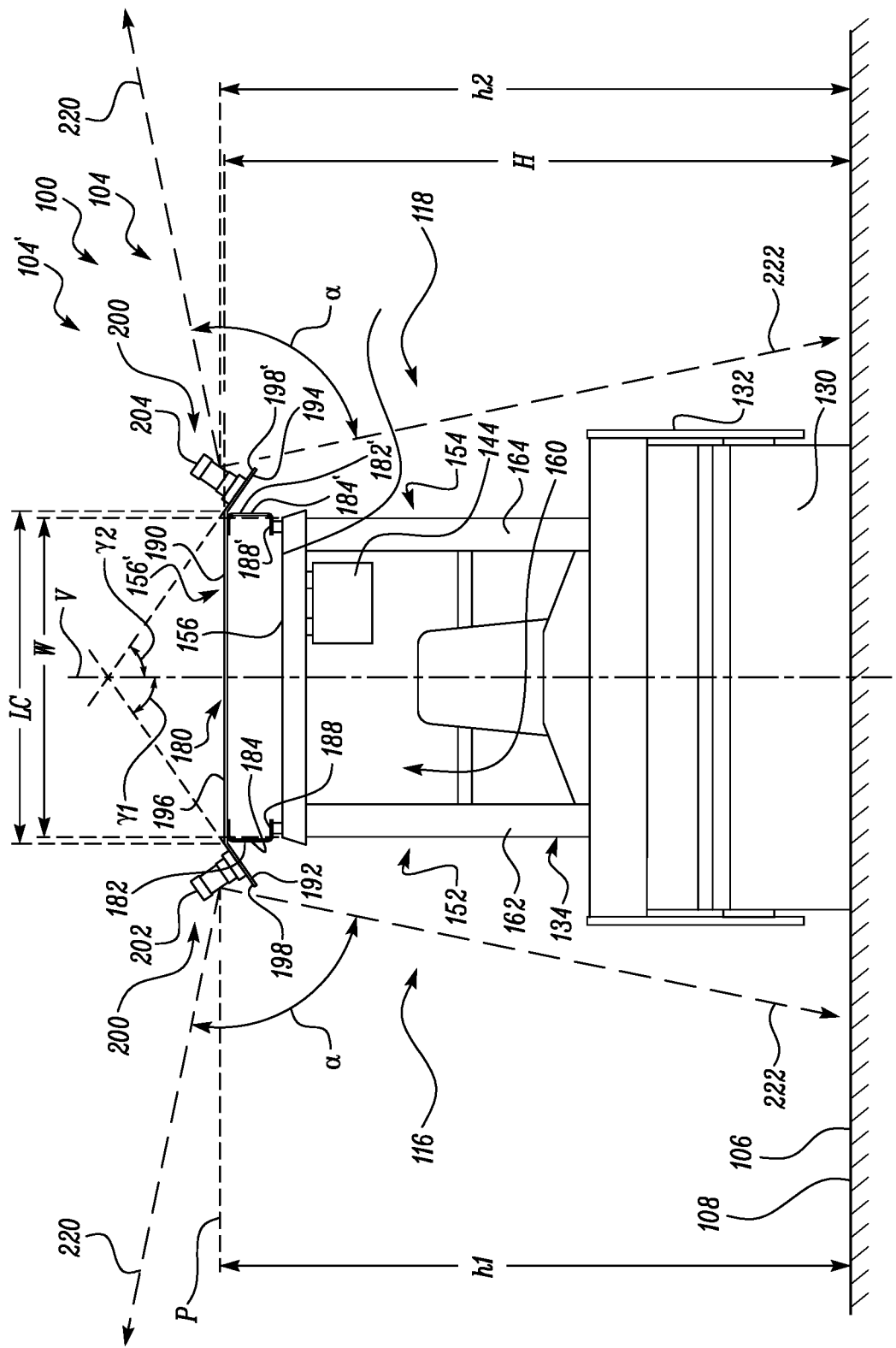
FIG. 3 is a front view of the machine, in accordance with an embodiment of the present disclosure.

Referring to FIGS. 1, 2, and 3, an exemplary machine 100 is illustrated. The machine 100 may operate at a worksite 102. The machine 100 may be a compacting machine 104 (e.g., a soil compactor 104') that may traverse across an expanse of the worksite 102. The machine 100 may be applied for compacting a paving material, such as, soil, sand, gravel, loose bedrock, asphalt, recycled concrete, bituminous mixtures, or any other compactable material. For example, the machine 100 may include a rolling compactor, a plate compactor, a self-propelled compactor, a compactor towed behind a paving machine, or any compaction device known in the art. Aspects of the present disclosure may be suitably applied to other machines that perform other operations in industries, such as mining, paving, construction, farming, and transportation. Such machines may include earth-moving machines, such as a wheel loader, an excavator, a dump truck, a backhoe, a motor-grader, a material handler, or the like.

The machine 100 may be configured to compact an operational surface 106, underlying the machine 100 to form a roadway 108 of the worksite 102. The operational surface 106 may be bordered by various features of the worksite 102, such as one or more of gravel portions 110, unpaved roadway portions, pavements, personnel, other machines, poles, rocks, trees, etc. Such features of the worksite 102 may be located on both sides of the roadway 108, or ahead or rearwards of the machine 100.

The machine 100 may be configured to operate either autonomously, semi-autonomously, or manually at the worksite 102. If the machine 100 were to operate autonomously, the machine 100 may operate based on information received from one or more sensors of the machine 100, without the need for an operator input. As an example, if the machine 100 were to operate autonomously, the machine 100 may automatically follow a path from one location to another based on input from one or more sensors of the machine 100. If the machine 100 were to operate semi-autonomously, an operator may be stationed, either within the machine 100 or remotely from the machine 100, such that some tasks may be performed by the operator, while the other tasks may be performed automatically by the machine 100 (e.g., based on information received from the various sensors). As an example, a semi-autonomously operating compacting machine 104 may automatically follow a path from one location to another but may rely upon an operator input to compact the operational surface 106. A manually operated machine 100 is one in which an operator may control all the functions of the machine 100.

The machine 100 includes a forward end 112 and a rearward end 114 opposite to the forward end 112. The forward end 112 and the rearward end 114 may be defined in relation to an exemplary direction of travel (indicated by an arrow 'A') of the machine 100 (see FIG. 2), with said direction of travel being defined from the rearward end 114 towards the forward end 112. Also, the machine 100 includes a first lateral side 116 and a second lateral side 118 opposite to the first lateral side 116. The first lateral side 116 and the second lateral side 118 are located transversely relative to a longitudinal axis 'L' defined along a length of the machine 100 or to the exemplary direction of travel 'A' of the machine 100 (also see FIG. 3).

The machine 100 may include a main frame assembly 120 extending from the rearward end 114 to the forward end 112 (see FIG. 2). The main frame assembly 120 may include an engine frame portion 122 and a non-engine frame portion 124 coupled to the engine frame portion 122 via an articulated joint (not shown). While an articulated main frame assembly (i.e., the main frame assembly 120) is discussed, aspects of the present disclosure may be applied to machines that include a non-articulated main frame assembly. The engine frame portion 122 may support a prime mover compartment 126 that may house a prime mover (not shown). The prime mover may include an engine, such as an internal combustion engine, configured to power operations of various systems on the machine 100, typically by combusting fuel. Optionally, the prime mover may also include an electrical power source, applicable either alone or in combination with the engine.

The engine frame portion 122 may be supported on a pair of wheels 128. The wheels 128 may be rotatably mounted with respect to the engine frame portion 122 and may be powered by the prime mover to rotate and to propel the machine 100 along the roadway 108. Further, the non-engine frame portion 124 may be supported on a drum 130. The drum 130 may be rotatably mounted to a yoke 132 of the non-engine frame portion 124 and may be configured to roll (and/or vibrate at a frequency) over the operational surface 106 to compact the operational surface 106, as the machine 100 traverses along the operational surface 106 to form the roadway 108. In operation, as the wheels 128 may rotate, the wheels 128 may propel the machine 100 and may in turn cause the drum 130 to roll over and compact the operational surface 106, as the machine 100 may move over the operational surface 106 to form the roadway 108.

The machine 100 includes an operator cabin 134 supported over the engine frame portion 122. The operator cabin 134 may acquire a position between the prime mover compartment 126 and the drum 130. The operator cabin 134 may facilitate stationing of one or more operators therein, to monitor the operations of the machine 100. Also, the operator cabin 134 may house various components and controls of the machine 100 that are meant for the machine's movement and operation over the worksite 102. The operator cabin 134 may also house one or more operator interfaces, such as one or more input devices 136 and output devices 138 as shown in FIG. 2. In an embodiment, the input devices 136 may include, but not limited to, a steering wheel 140, a joystick 142, switches (not shown), and the like. The output devices 138 may include, but not limited to, a visual display unit 144. The visual display unit 144 may be provided within the operator cabin 134 to ascertain a visual data pertaining to a peripheral region 146 around the machine 100. Alternatively, the visual display unit 144 may be provided remotely to enable operators, supervisors, site inspectors, and even automated controllers of the machine 100, to monitor the peripheral region 146 around the machine 100 at the worksite 102, and accordingly, control a pace and a nature of the machine's operation at the worksite 102.

The operator cabin 134 may include a front portion 148 and a rear portion 150 opposite to the front portion 148. The front portion 148 and the rear portion 150 are defined along the longitudinal axis of the machine 100 (see FIG. 1). The front portion 148 may be disposed proximally relative to the forward end 112 and distally relative to the rearward end 114 of the machine 100. The rear portion 150 may be disposed proximally relative to the rearward end 114 and distally relative to the forward end 112 of the machine 100. Also, the operator cabin 134 may include a left-hand portion 152 and a right-hand portion 154, located transversely relative to the longitudinal axis of the machine 100 (see FIG. 3). The right-hand portion 154 may be laterally opposite to the left-hand portion 152. The left-hand portion 152 may be disposed towards the first lateral side 116 of the machine 100 (when viewed from the forward end 112 of the machine 100, see FIG. 3), while the right-hand portion 154 may be disposed towards the second lateral side 118 of the machine 100 (when viewed from the forward end 112 of the machine 100, see FIG. 3).

The operator cabin 134 may include a roof portion 156 and a floor portion 158 positioned below the roof portion 156 along a vertical axis 'V', defined along a height 'H' of the machine 100. The roof portion 156 and the floor portion 158 may be extended from the rear portion 150 to the front portion 148 of the operator cabin 134. The roof portion 156 and the floor portion 158 may be connected to each other by multiple posts to enclose a cab volume 160 (see FIG. 2), and to protect the cab volume 160 from an outside weather and the general harshness that may be found at the worksite 102. In the present embodiment, these posts may include four posts, including a front-left post 162, a front-right post 164, a rear-left post 166, and a rear-right post 168. The front-left post 162 and the front-right post 164 may be disposed proximally relative to the front portion 148 and distally relative to the rear portion 150. The rear-left post 166 and the rear-right post 168 may be disposed proximally relative to the rear portion 150 and distally relative to the front portion 148. The roof portion 156 may be integrally attached to the posts 162-168, however, the roof portion 156 may be separable from the posts 162-168, in some embodiments.

Referring to FIGS. 2 and 3, the machine 100 also includes a mounting structure 180. The mounting structure 180 may be attached to the roof portion 156 of the operator cabin 134. The mounting structure 180 may be configured to mount one or more devices and/or sensors, for example, perception devices associated with the machine 100, to the operator cabin 134 (discussed later). The mounting structure 180 includes a first frame 182, a second frame 182', and a bracket 190. The first frame 182 and the second frame 182' may be substantially identical to each other. In the present embodiment, the first frame 182 and the second frame 182' include body portions 184, 184', respectively, and the body portions 184, 184' in turn define upper flanges 186, 186' and lower flanges 188, 188', respectively. In an example, both the first frame 182 and the second frame 182' may include C-shaped frames. In another example, both the first frame 182 and the second frame 182' may include I-shaped frames.

The first frame 182 and the second frame 182' are mounted atop the roof portion 156, such that the lower flange 188 of the first frame 182 and the lower flange 188' of the second frame 182' are fixedly connected to the roof portion 156 (e.g., by welding). The upper flanges 186, 186' face upwards and away from the roof portion 156 in such an arrangement of the frames (i.e., the first frame 182 and the second frame 182'). Further, the first frame 182 and the second frame 182' are located towards either sides of the machine 100—e.g., the first frame 182 may be disposed towards the left-hand portion 152 of the operator cabin 134 (when viewed from the forward end 112 of the machine 100, see FIG. 3), while the second frame 182' may be disposed towards the right-hand portion 154 of the operator cabin 134 (when viewed from the forward end 112 of the machine 100, see FIG. 3).

The bracket 190 includes a body 191 having a first section 192, a second section 194, and a cross-piece 196. The cross-piece 196 extends between the first section 192 and the second section 194, as shown. In that manner, the first section 192 and the second section 194 are disposed at either ends of the cross-piece 196. The cross-piece 196 may be plate-shaped and may be generally elongated in profile (also see FIG. 5). Further, the cross-piece 196 may define a length 'LC' that may equal a width 'W' defined by the roof 156 or, in some cases, the length 'LC' of the cross-piece 196 may be larger than the width 'W' of the roof 156.

Each of the first section 192 and the second section 194 may be angularly disposed (or be bent) (e.g., with an angular offset) with respect to the cross-piece 196 (see FIG. 3). Further, both the first section 192 and the second section 194 may be integrally and contiguously extending sections that extends from either ends of the cross-piece 196. In this regard, the bracket 190, with the cross-piece 196, first section 192, and the second section 194, may be all integrally formed—although, in some cases, it is possible for the first section 192 and the second section 194 to be separate, individual components that may be attachable to the cross-piece 196 (or to the ends of the cross-piece 196) by way of conventional industrial fastening techniques (e.g., welding). Moreover, the angular offset defined by the first section 192 with respect to the cross-piece 196 may be equal to the angular offset defined by the second section 194 with respect to the cross-piece 196, although, in some cases, these angular offsets may differ from each other. Although not limited, a shape and profile defined by the first section 192 may also be similar to a shape and profile defined by the second section 194. In the present embodiment, the cross-piece 196, and, thus, the bracket 190, as a whole, may be disposed orthogonally relative to the vertical axis 'V' of the machine 100 (when viewed from the forward end 112, see FIG. 3).

Further, the bracket 190 may be mounted over the first frame 182 and the second frame 182'. In the present embodiment, the bracket 190 is mounted to the upper flange 186 of the first frame 182 and to the upper flange 186' of the second frame 182'. In mounting the bracket 190 over the first frame 182 and the second frame 182', the first section 192 may be disposed proximal to the first frame 182 and distal to the second frame 182' (when viewed from the forward end 112 of the machine 100, see FIG. 3), while the second section 194 may be disposed proximal to the second frame 182' and distal to the first frame 182 (when viewed from the forward end 112 of the machine 100, see FIG. 3). Moreover, the first section 192 may extend at least partly outwardly beyond the first lateral side 116, and, similarly, the second section 194 may extend at least partly outwardly beyond the second lateral side 118.

Figure 4:
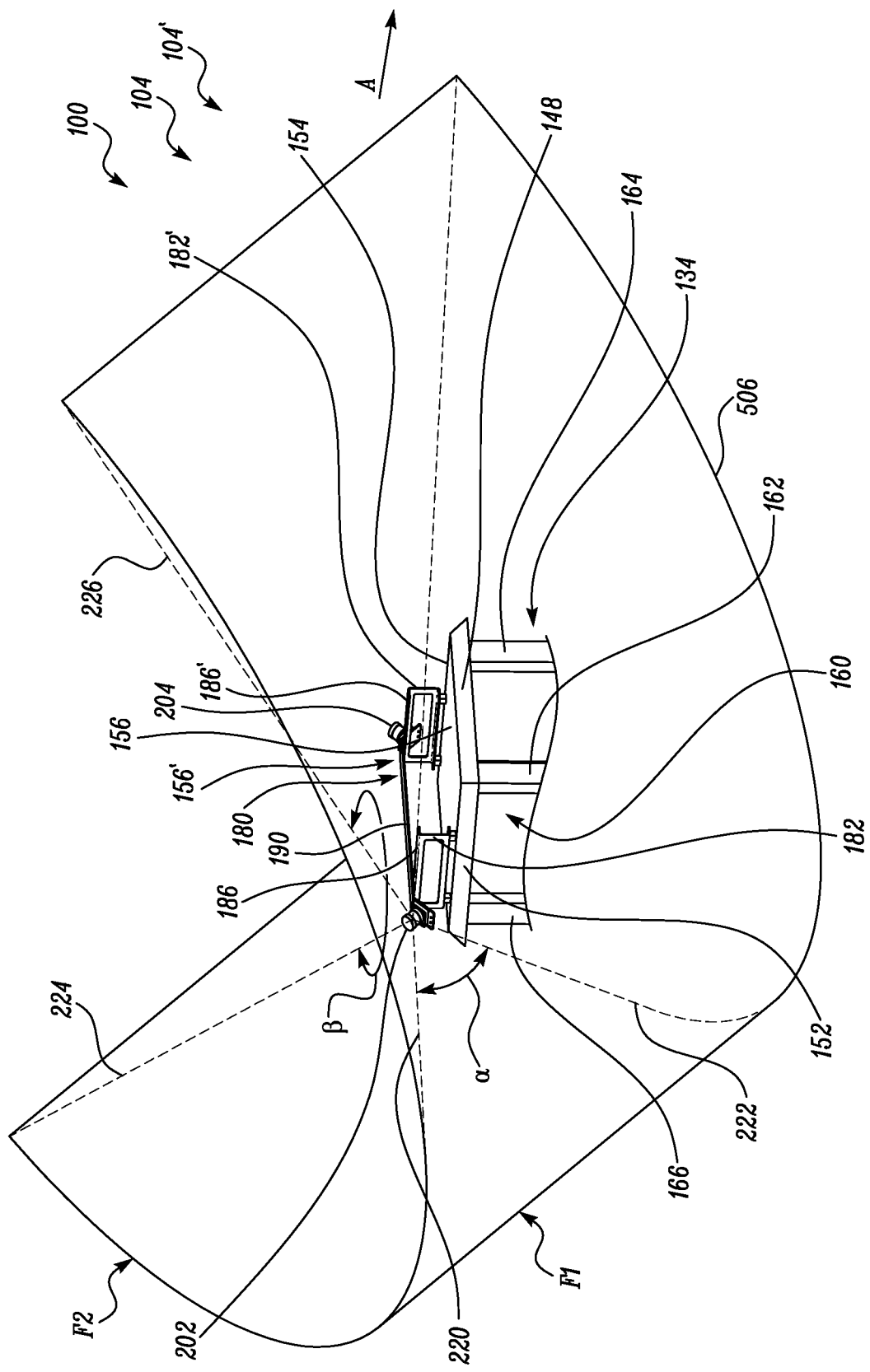
FIG. 4 is a sectional view of an operator cabin of the machine with a perception device of the peripheral perception system scanning a first field of view covering a first peripheral region of the machine, in accordance with an embodiment of the present disclosure.

In the present embodiment, the mounting structure 180 may be disposed towards the rear portion 150 of the operator cabin 134 (see FIGS. 1, 2, and 4). In another embodiment, the mounting structure 180 may be attached to the roof portion 156 towards the front portion 148 of the operator cabin 134. Although the mounting structure 180 may be attached to the roof portion 156 as has been suggested in the present disclosure, in some cases, the mounting structure 180 may alternatively be attached to one or more of the posts 162-168 through suitable links and joints as may be contemplated by someone of skill in the art. Further, the mounting structure 180 may also be integrally formed with the roof portion 156, in some embodiments.

According to an aspect of the present disclosure, the roof portion 156 along with the mounting structure 180 defines a roof 156' of the operator cabin 134 of the machine 100. Further, the bracket 190 defines a top surface 197. The top surface 197 defined on the first section 192 defines a first surface 198 of the roof 156' and the top surface 197 defined on the second section 194 defines a second surface 198' of the roof 156'. Also, as may be visualized from the FIGS. 2 and 3, the roof 156' is higher and extends above the prime mover compartment 126 and the drum 130 of the machine 100 along the vertical axis 'V' and generally defines an upper most portion of the machine 100. Thus, the reference 'roof 156'' may be implied to refer to a roof of the machine 100.

Referring to FIGS. 2 and 3, the machine 100 includes a peripheral perception system 200 for scanning and covering the peripheral region 146 surrounding the machine 100. The peripheral perception system 200 is configured to provide at least a 360-degree coverage of the peripheral region 146 around the machine 100. The peripheral perception system 200 includes a first perception device 202 and a second perception device 204.

Figure 5:
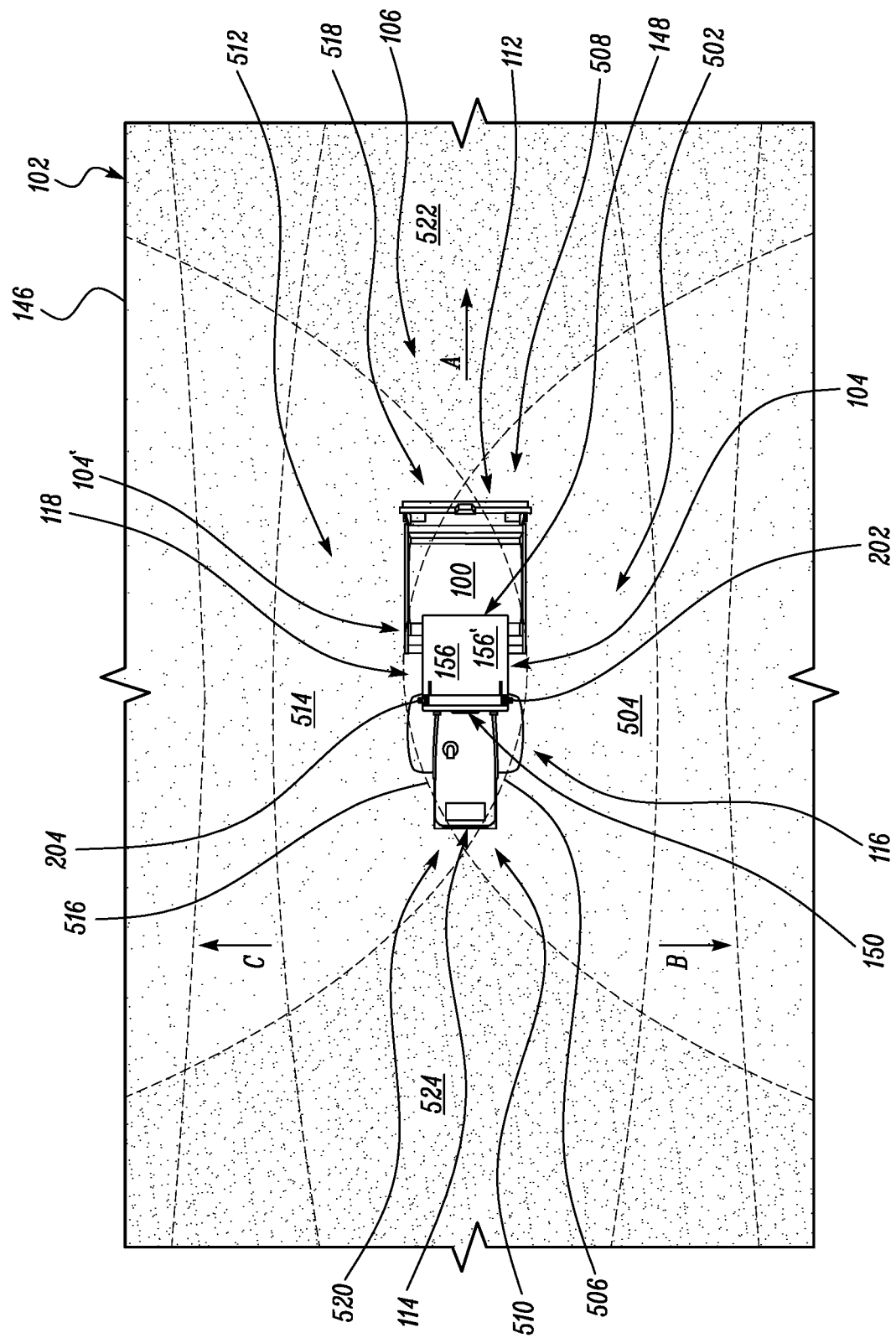
FIG. 5 is a plan view of the machine and its surroundings, and illustrates a portion of a field of view scanned by the peripheral perception system, in accordance with an embodiment of the present disclosure.

With continued reference to FIGS. 2 and 3 and also with reference to FIG. 5, each of the first perception device 202 and the second perception device 204 is configured to scan respective field of views. For example, the first perception device 202 is configured to scan a first field of view 502 covering a first peripheral region 504 (see FIG. 5) of the machine 100 including the first lateral side 116 of the machine 100, a first part 508 of the forward end 112, and a first part 510 of the rearward end 114 of the machine 100. Similarly, the second perception device 204 is configured to scan a second field of view 512 covering a second peripheral region 514 of the machine 100 including the second lateral side 118 of the machine 100, a second part 518 of the forward end 112, and a second part 520 of the rearward end 114 of the machine 100.

Each of the first perception device 202 and the second perception device 204 may embody LIDAR (light detection and ranging) devices, having a pre-defined vertical field of view 'F1' and a pre-defined horizontal field of view 'F2' An exemplary vertical field of view 'F1' is shown in FIGS. 3 and 4 for each of the first perception device 202 and the second perception device 204. The vertical field of view 'F1' extends between a first boundary line 220 and a second boundary line 222, to define a first view angle 'α', therebetween. An exemplary horizontal field of view 'F2' is shown in FIG. 4 for the first perception device 202. The horizontal field of view 'F2' extends between a third boundary line 224 and a fourth boundary line 226, to define a second view angle 'β', therebetween.

In the present embodiment, each of the first perception device 202 and the second perception device 204 has the vertical field of view (i.e. the first view angle 'α') within a range of 80 degrees to 120 degrees, and the horizontal field of view (i.e. the second view angle 'β') within a range of 180 degrees to 220 degrees. In a first example, each of the first perception device 202 and the second perception device 204 has a 90-degree vertical field of view and a 220-degree horizontal field of view. In a second example, each of the first perception device 202 and the second perception device 204 has a 95-degree vertical field of view and a 210-degree horizontal field of view.

For understanding one or more aspects of the present disclosure, a vertical placement of the first perception device 202 and the second perception device 204 with regard to the first example will now be defined. The vertical placement of the first perception device 202 and the second perception device 204 shall be understood as a state in which the vertical field of view scanned by the first perception device 202 and the second perception device 204 makes an angle of +45 degrees above a horizontal axis 'P' and −45 degrees below the horizontal axis 'P'. The horizontal axis 'P' extends along the width 'W' of the machine 100, as shown in FIG. 3. Further, with regard to the second example, the vertical placement of the first perception device 202 and the second perception device 204 shall be understood as a state in which the vertical field of view scanned by the first perception device 202 and the second perception device 204 makes an angle of +21 degrees above the horizontal axis 'P' and −74 degrees below the horizontal axis 'P'. It may be noted that the aspects of the present disclosure have been discussed with respect to the first perception device 202 and the second perception device 204 of the first example.

It is contemplated that the first perception device 202 and the second perception device 204 could alternatively embody another type of perception device such as, for example, RADAR (radio detection and ranging) devices, SONAR (sound navigation and ranging) devices, camera devices, thermal scanners, and/or other types of devices for scanning the peripheral region 146 around the machine 100.

The first perception device 202 and the second perception device 204 are located towards either sides of the machine 100. In addition, the first perception device 202 and the second perception device 204 may be symmetrically located about the longitudinal axis 'L' of the machine 100 (see FIG. 1). The first perception device 202 is mounted to the first surface 198 of the machine 100 (or the operator cabin 134, see FIGS. 2 and 3). In the present embodiment, although the first surface 198 is defined at the first section 192 of the bracket 190 of the mounting structure 180, based on factors such as spatial constraints, etc., the first surface 198 may be varied and defined elsewhere on the roof portion 156 instead, or the first surface 198 may be defined on a side panel disposed at the first lateral side 116 of the operator cabin 134 of the machine 100. However, in each such variation, the coverage of the field of the view scannable by the first perception device 202 mounted to such a first surface may remain largely unaffected.

As shown, the first perception device 202 is mounted on the first section 192 of the mounting structure 180, or the first surface 198 defined on the first section 192, such that the first perception device 202 extends outwards from the first surface 198, towards and beyond the first lateral side 116 of the machine 100. Further, the first perception device 202 is mounted on the first section 192 of the mounting structure 180, or the first surface 198, such that the first perception device 202 defines a first elevation 'h1' with respect to the operational surface 106 underlying the machine 100. Also, the first perception device 202 is mounted on the first section 192 of the mounting structure 180, or the first surface 198, and given that the first section 192 is bent or angled relative to the cross-piece 196, the first perception device 202 is tilted with respect to its vertical placement to be directed downwardly towards the operational surface 106 to define a first angle 'γ1' with respect to the vertical axis 'V' (see FIG. 3).

Similarly, the second perception device 204 is mounted to the second surface 198' of the machine 100 (or the operator cabin 134, see FIGS. 2 and 3). In the present embodiment, the second surface 198' is defined at the second section 194 of the bracket 190 of the mounting structure 180, as already discussed above. Similar to the first surface 198, the second surface 198' may be defined elsewhere on the roof portion 156 instead, or the second surface 198' may be defined on a side panel disposed at the second lateral side 118 of the operator cabin 134 of the machine 100. However, in each such variation, the coverage of the field of the view scannable by the second perception device 204 mounted to such a second surface may remain largely unaffected.

Further, the second perception device 204 is mounted on the second section 194 of the mounting structure 180, or the second surface 198' defined on the second section 194, such that the second perception device 204 extends outwards from the second surface 198', towards and beyond the second lateral side 118 of the machine 100. Furthermore, the second perception device 204 is mounted on the second section 194 of the mounting structure 180, or the second surface 198', such that the second perception device 204 defines a second elevation 'h2' with respect to the operational surface 106 underlying the machine 100. Also, the second perception device 204 is mounted on the second section 194 of the mounting structure 180, or the second surface 198', and given that the second section 194 is bent or angled relative to the cross-piece 196, the second perception device 204 is tilted with respect to its vertical placement to be directed downwardly towards the operational surface 106 to define a second angle 'γ2' with respect to the vertical axis 'V' (see FIG. 3).

In the present embodiment, each of the first angle 'γ1' associated with the first perception device 202 and the second angle 'γ2' associated with the second perception device 204 is an acute angle with respect to the vertical axis 'V' (see FIG. 3). More specifically, the first angle 'γ1' and the second angle 'γ2' lies within a range of 10 degrees to 60 degrees with respect to the vertical axis 'V'. Also, the first angle 'γ1' may be equal to the second angle 'γ2'. In one example, each of the first angle 'γ1' and the second angle 'γ2' is 45-degrees with respect to the vertical axis 'V'. In another example, each of the first angle 'γ1' and the second angle 'γ2' is 15 degrees with respect to the vertical axis 'V'. Further, in the present embodiment, the first elevation 'h1' of the first perception device 202 is equal to or less than the second elevation 'h2' of the second perception device 204.

INDUSTRIAL APPLICABILITY

During operations, as the machine 100 traverses over the worksite 102, it is desirable to obtain a 360-degree coverage of the worksite 102, particularly, a 360-degree coverage of the peripheral region 146 around the machine 100. The disclosed peripheral perception system 200 provides the 360-degree coverage of the peripheral region 146 around the machine 100. The peripheral perception system 200 provides the 360-degree coverage by utilizing only two perceptions devices, i.e. the first perception device 202 mounted at the first surface 198 to define the first elevation 'h1' with respect to the operational surface 106 and the first angle 'γ1' with respect to the vertical axis 'V', and the second perception device 204 mounted at the second surface 198' to define the second elevation 'h2' with respect to the operational surface 106 and the second angle 'γ2' with respect to the vertical axis 'V'.

Due to the first elevation 'h1' and the first angle 'γ1', the first perception device 202 is configured to scan the first field of view 502 covering a portion of the peripheral region 146, i.e. the first peripheral region 504 (see FIG. 5) of the machine 100. The first field of view 502 is shown extending from a first boundary curve 506 towards a first direction (indicated by an arrow 'B'). The first peripheral region 504 includes the first lateral side 116, the first part 508 of the forward end 112 of the machine 100, and the first part 510 of the rearward end 114 of the machine 100. Similarly, due to the second elevation 'h2' and the second angle 'γ2', the second perception device 204 is configured to scan the second field of view 512 covering another portion of the peripheral region 146, i.e. the second peripheral region 514 of the machine 100. The second field of view 512 is shown extending from a second boundary curve 516 towards a second direction (indicated by an arrow 'C'). The second peripheral region 514 includes the second lateral side 118, the second part 518 of the forward end 112 of the machine 100, and the second part 520 of the rearward end 114 of the machine 100.

Additionally, the coverage provided by both the first perception device 202 and the second perception device 204 may also extend below the operational surface 106. For example, when the machine 100 approaches a decline defined along the operational surface 106, such a coverage may enable the first perception device 202 and the second perception device 204 to scan downhill along the decline. Also, the coverage provided by both the first perception device 202 and the second perception device 204 may extend upwards past the roof 156' of the machine 100. This may enable the first perception device 202 and the second perception device 204 to scan features (e.g., branches of trees), located above the roof 156' and may help avoid collisions between the machine 100 and such features.

The first field of view 502 and the second field of view 512 may overlap each other. In the present embodiment, the first field of view 502 and the second field of view 512 overlaps towards and beyond the forward end 112 and the rearward end 114 of the machine 100, respectively. More specifically, the first field of view 502 and the second field of view 512 overlaps towards and beyond the forward end 112 to form a first overlapping region 522, and the first field of view 502 and the second field of view 512 overlaps towards and beyond the rearward end 114 to form a second overlapping region 524 (see FIG. 5). In that manner, both the first perception device 202 and the second perception device 204 are able to scan the first overlapping region 522 and the second overlapping region 524.

In operation, the first perception device 202 scans the first field of view 502 to generate a first data associated with the first peripheral region 504 around the machine 100. Similarly, the second perception device 204 scans the second field of view 512 to generate a second data associated with the second peripheral region 514 around the machine 100. The first data associated with the first peripheral region 504 and the second data associated with the second peripheral region 514 are processed, for example, via controller (not shown) associated with the machine 100, to obtain the 360-degree coverage of the peripheral region 146 around the machine 100.

With the applicability of the peripheral perception system 200 utilizing only two perception devices, i.e. the first perception device 202 and the second perception device 204, mounted on the machine 100 in the aforementioned configuration, the full 360-degree coverage of the peripheral region 146 around the machine 100 is obtained. The disclosed peripheral perception system 200 thus mitigates the requirement of installing more than two perception devices, at different positions, on the machine 100 to attain the 360-degree coverage, which ultimately leads to the reduction in perception data processing power requirements, overall costing, and footprint of the machine 100.

It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

What is claimed is:

1. A peripheral perception system for a machine, the peripheral perception system comprising:

a mounting structure configured to be attached to a surface of the machine, the mounting structure including:
  a first frame configured to be located towards a first lateral side of the machine and including a first upper flange,
  a second frame configured to be located toward a second lateral side of the machine and including a second upper flange, and
  a bracket mounted to the first upper flange and the second upper flange and including:
    a first section,
    a second section, and
    a cross-piece extending therebetween and mounted to the first upper flange and the second upper flange,
      wherein the first section is angularly disposed relative to the cross-piece and configured to extend outwardly beyond the first lateral side of the machine, and
      wherein the second section is angularly disposed relative to the cross-piece and configured to extend outwardly beyond the second lateral side of the machine;
a first perception device configured to be mounted to the first section of the bracket, the first perception device configured to define a first elevation with respect to an operational surface underlying the machine and a first angle with respect to a vertical axis defined along a height of the machine, the first perception device being configured to scan a first field of view covering a first peripheral region of the machine including the first lateral side of the machine, a first part of a forward end of the machine, and a first part of a rearward end of the machine; and
a second perception device configured to be mounted to the second section of the bracket, the second perception device configured to define a second elevation with respect to the operational surface and a second angle with respect to the vertical axis, the second perception device being configured to scan a second field of view covering a second peripheral region of the machine including the second lateral side of the machine disposed opposite to the first lateral side of the machine, a second part of the forward end of the machine, and a second part of the rearward end of the machine,
  wherein the first field of view and the second field of view are configured to combinedly provide a 360-degree coverage of a peripheral region around the machine.

2. The peripheral perception system of claim 1, wherein the surface of the machine is a roof of the machine.

3. The peripheral perception system of claim 1, wherein the first elevation of the first perception device is equal to or less than the second elevation of the second perception device.

4. The peripheral perception system of claim 1, wherein each of the first angle and the second angle is an acute angle with respect to the vertical axis.

5. The peripheral perception system of claim 1, wherein the first perception device and the second perception device are tilted to be directed downwardly towards the operational surface to define the first angle and the second angle with respect to the vertical axis, respectively.

6. The peripheral perception system of claim 1, wherein the first perception device and the second perception device are tilted such that each of the first angle and the second angle lies within a range of 10 degrees to 60 degrees with respect to the vertical axis.

7. The peripheral perception system of claim 1, wherein the first perception device and the second perception device are light detection and ranging (LiDAR) devices.

8. The peripheral perception system of claim 1, wherein each of the first perception device and the second perception device has a vertical field of view within a range of 80 degrees to 120 degrees.

9. The peripheral perception system of claim 1, wherein each of the first perception device and the second perception device has a horizontal field of view within a range of 180 degrees to 220 degrees.

10. The peripheral perception system of claim 1, wherein the first field of view and the second field of view overlap towards and beyond the forward end and the rearward end of the machine.

11. A machine defining a forward end, a rearward end, a first lateral side and a second lateral side opposite to the first lateral side, the machine comprising:
  an operator cabin;
  a mounting structure attached to a surface of the operator cabin, the mounting structure including:
    a first frame located towards the first lateral side of the machine and including a first upper flange,
    a second frame located toward the second lateral side of the machine and including a second upper flange, and
    a bracket mounted to the first upper flange and the second upper flange and including:
      a first section,
      a second section, and
      a cross-piece extending therebetween and mounted to the first upper flange and the second upper flange,
        wherein the first section is angularly disposed relative to the cross-piece and extends outwardly beyond the first lateral side of the machine, and
        wherein the second section is angularly disposed relative to the cross-piece and extends outwardly beyond the second lateral side of the machine;
  a first perception device mounted to the first section of the bracket, the first perception device defining a first elevation with respect to an operational surface underlying the machine and a first angle with respect to a vertical axis defined along a height of the machine, the first perception device being configured to scan a first field of view covering a first peripheral region of the machine including the first lateral side of the machine, a first part of the forward end, and a first part of the rearward end of the machine; and
  a second perception device mounted to the second section of the bracket, the second perception device defining a second elevation with respect to the operational surface underlying the machine and a second angle with respect to the vertical axis, the second perception device being configured to scan a second field of view covering a second peripheral region of the machine including the second lateral side of the machine, a second part of the forward end, and a second part of the rearward end of the machine wherein
    the first field of view and the second field of view overlap towards and beyond the forward end and the rearward end of the machine, and the first field of view and the second field of view combinedly provide a 360-degree coverage of a peripheral region around the machine.

12. The machine of claim 11, wherein the machine is a soil compactor.

13. The machine of claim 11, wherein the first elevation of the first perception device is equal to or less than the second elevation of the second perception device.

14. The machine of claim 11, wherein each of the first angle and the second angle is an acute angle with respect to the vertical axis.

15. The machine of claim 11, wherein the first perception device and the second perception device are tilted to be directed downwardly towards the operational surface to define the first angle and the second angle with respect to the vertical axis, respectively.

16. The machine of claim 11, wherein each of the first angle and the second angle lies within a range of 10 degrees to 60 degrees with respect to the vertical axis.

17. The machine of claim 11, wherein the first perception device and the second perception device are symmetrically located about a longitudinal axis of the machine.

18. The machine of claim 11, wherein the first perception device and the second perception device are light detection and ranging (LiDAR) devices.

19. The machine of claim 11, wherein each of the first perception device and the second perception device has a vertical field of view within a range of 80 degrees to 120 degrees.

20. The machine of claim 11, wherein each of the first perception device and the second perception device has a horizontal field of view within a range of 180 degrees to 220 degrees.

* * * * *